United States Patent
Matalanis et al.

(10) Patent No.: US 10,571,074 B2
(45) Date of Patent: Feb. 25, 2020

(54) LUBRICANT LEVEL SENSING FOR AN ACTUATOR

(71) Applicant: SIKORSKY AIRCRAFT CORPORATION, Stratford, CT (US)

(72) Inventors: Claude G. Matalanis, Longmeadow, MA (US); Ulf J. Jonsson, South Windsor, CT (US); John D. Cannata, Marlborough, CT (US); Brian E. Wake, South Glastonbury, CT (US)

(73) Assignee: SIKORSKY ARICRAFT CORPORATION, Stratford, CT (US)

( * ) Notice: Subject to any disclaimer, the term of this patent is extended or adjusted under 35 U.S.C. 154(b) by 257 days.

(21) Appl. No.: 15/520,016

(22) PCT Filed: Aug. 27, 2015

(86) PCT No.: PCT/US2015/047137
§ 371 (c)(1),
(2) Date: Apr. 18, 2017

(87) PCT Pub. No.: WO2016/076937
PCT Pub. Date: May 19, 2016

(65) Prior Publication Data
US 2017/0336024 A1  Nov. 23, 2017

Related U.S. Application Data

(60) Provisional application No. 62/069,506, filed on Oct. 28, 2014.

(51) Int. Cl.
*F16N 29/00* (2006.01)
*B64C 27/615* (2006.01)
(Continued)

(52) U.S. Cl.
CPC .......... *F16N 29/00* (2013.01); *B64C 27/615* (2013.01); *B64C 27/72* (2013.01); *G01F 23/164* (2013.01);
(Continued)

(58) Field of Classification Search
CPC ....... F16N 29/00; B64C 27/615; B64C 27/72; G01F 23/164
See application file for complete search history.

(56) References Cited

U.S. PATENT DOCUMENTS 4,625,553 A * 12/1986 Charter .................... G01N 9/26
73/438
5,256,042 A * 10/1993 McCullough ......... F04C 29/025
418/1
(Continued)

FOREIGN PATENT DOCUMENTS

EP        2584323  B1   12/2013

OTHER PUBLICATIONS

Notification of Transmittal of the International Search Report for International Application No. PCT/US2015/047137 dated Apr. 2, 2016; dated Apr. 13, 2016; 9 pages.
(Continued)

*Primary Examiner* — Michael A Riegelman
(74) *Attorney, Agent, or Firm* — Cantor Colburn LLP

(57) ABSTRACT

According to one aspect, a lubricant level sensing system for an actuator is provided. The lubricant level sensing system includes a pressure port in an outer housing of the actuator, a pressure sensor, and a pathway from the pressure port to the pressure sensor. The pathway establishes fluid communication between the pressure sensor and a free volume of an internal cavity of the outer housing relative to a lubricant
(Continued)

level in the internal cavity such that the pressure sensor detects a pressure of the free volume used to derive the lubricant level.

8 Claims, 8 Drawing Sheets

(51) Int. Cl.
*B64C 27/72* (2006.01)
*G01F 23/16* (2006.01)

(52) U.S. Cl.
CPC .. *B64C 2027/7294* (2013.01); *F16N 2250/04* (2013.01); *F16N 2250/18* (2013.01)

(56) References Cited

U.S. PATENT DOCUMENTS

| | | | | |
|---|---|---|---|---|
| 5,303,586 | A * | 4/1994 | Zhao | G01F 23/164 250/900 |
| 5,387,083 | A * | 2/1995 | Larson | B64C 27/615 416/23 |
| 5,626,312 | A * | 5/1997 | Head | B64C 27/615 244/17.25 |
| 6,282,953 | B1 * | 9/2001 | Benjey | B60K 15/077 73/1.32 |
| 6,499,690 | B1 * | 12/2002 | Katayama | B64C 27/615 244/17.11 |
| 6,508,439 | B1 * | 1/2003 | Fink | B64C 3/50 244/215 |
| 6,549,126 | B2 * | 4/2003 | Hageman | B60T 8/00 340/450.1 |
| 6,974,115 | B2 * | 12/2005 | Silva | F01C 21/10 251/30.01 |
| 7,032,449 | B2 * | 4/2006 | Rivas P. | G01N 9/26 73/299 |
| 7,677,868 | B2 | 3/2010 | Chaudhry et al. | |
| 8,626,359 | B2 * | 1/2014 | Andrews | B64C 27/72 244/17.13 |
| 8,690,443 | B2 | 4/2014 | Jonsson et al. | |
| 8,727,722 | B2 * | 5/2014 | Houser | B64C 27/001 416/1 |
| 9,517,839 | B2 * | 12/2016 | Brewer | B64C 27/615 |
| 2007/0261922 | A1 * | 11/2007 | Mullen | B64C 27/14 184/6.12 |
| 2008/0101931 | A1 * | 5/2008 | Chaudhry | B64C 27/615 416/131 |
| 2008/0138203 | A1 * | 6/2008 | Collins | B64C 27/615 416/23 |
| 2008/0145221 | A1 * | 6/2008 | Sun | B64C 27/615 416/23 |
| 2011/0164979 | A1 * | 7/2011 | Jonsson | B64C 27/615 416/147 |
| 2013/0336787 | A1 * | 12/2013 | Brewer | B64C 27/72 416/23 |
| 2014/0083216 | A1 * | 3/2014 | Brewer | B64C 27/615 74/25 |
| 2017/0336024 | A1 * | 11/2017 | Matalanis | B64C 27/615 |
| 2018/0281932 | A1 * | 10/2018 | Wake | B64C 7/00 |

OTHER PUBLICATIONS

Written Opinion of the International Searching Authority for International Application No. PCT/US2015/047137 dated Apr. 2, 2016; dated Apr. 13, 2016; 7 pages.

* cited by examiner

LUBRICANT LEVEL SENSING FOR AN ACTUATOR

CROSS REFERENCE TO RELATED APPLICATIONS

This application is a National Stage application of PCT/US2015/047137, filed Aug. 27, 2015, which claims the benefit of U.S. Provisional Application No. 62/069,506, filed Oct. 28, 2014, both of which are incorporated by reference in their entirety herein.

STATEMENT REGARDING FEDERALLY SPONSORED RESEARCH OR DEVELOPMENT

This invention was made with government support under contract number W911W6-11-2-0004 awarded by the United States Army. The government has certain rights in the invention.

BACKGROUND OF THE INVENTION

The subject matter disclosed herein relates to fluid level sensing, and in particular to lubricant level sensing for an actuator.

Actuators, such as electromechanical actuators, typically require an adequate amount of lubrication. When insufficient lubricant is retained within an electromechanical actuator, reduced performance or damage may occur. Detection of oil level can be difficult in applications where the electromechanical actuator is mounted on a mobile structure such that the electromechanical actuator is subject to substantial changes in orientation, velocity, acceleration, and vibration. One example is a self-lubricated actuator for a rotor blade control surface of a helicopter, where a lubrication medium, such as oil, substantially immerses a number of components within a body of the actuator. A rotor blade control surface actuator is subject to substantial centrifugal force, as well as other forces due to blade flapping, aircraft maneuvering, aircraft speed, acceleration, environmental factors, and other factors that can result in a number of challenges to reliably detect oil level in the actuator.

BRIEF DESCRIPTION OF THE INVENTION

According to an aspect of the invention, a lubricant level sensing system for an actuator is provided. The lubricant level sensing system includes a pressure port in an outer housing of the actuator, a pressure sensor, and a pathway from the pressure sensor to a free volume. The pathway establishes fluid communication between the pressure sensor and the free volume of an internal cavity of the outer housing relative to a lubricant level in the internal cavity such that the pressure sensor detects changes in pressure of the free volume used to derive the lubricant level.

In addition to one or more of the features described above or below, or as an alternative, further embodiments could include where the actuator is a self-lubricated actuator configured to retain a volume of the lubricant and the free volume.

In addition to one or more of the features described above or below, or as an alternative, further embodiments could include where the actuator is an electromechanical actuator that drives an output rod.

In addition to one or more of the features described above or below, or as an alternative, further embodiments could include where the pressure port interfaces with the free volume while a centrifugal force is applied to the actuator.

In addition to one or more of the features described above or below, or as an alternative, further embodiments could include where a change in pressure amplitude detectable at the pressure sensor is indicative of change in the lubricant level.

In addition to one or more of the features described above or below, or as an alternative, further embodiments could include a control computer operable to monitor an output of the pressure sensor relative to the position of the actuator, and to derive the lubricant level from the detected output of the pressure sensor.

In addition to one or more of the features described above or below, or as an alternative, further embodiments could include where the actuator drives a control surface of a rotor blade of a helicopter.

In addition to one or more of the features described above or below, or as an alternative, further embodiments could include where the pressure sensor includes a pair of sensing membranes that produce a difference signal between a pair of outputs from the pair of sensing membranes.

According to further aspects of the invention, a method for sensing a lubricant level in an actuator is provided. A control computer coupled to a pressure sensor detects a pressure of a free volume of an internal cavity of an outer housing of the actuator relative to the lubricant level in the internal cavity using the pressure sensor in fluid communication with a pressure port of the outer housing of the actuator. The control computer determines the lubricant level in the actuator based on the detected pressure of the free volume.

BRIEF DESCRIPTION OF THE DRAWINGS

The present disclosure is illustrated by way of example and not limited in the accompanying figures in which like reference numerals indicate similar elements.

DETAILED DESCRIPTION OF THE INVENTION

Figure 1:
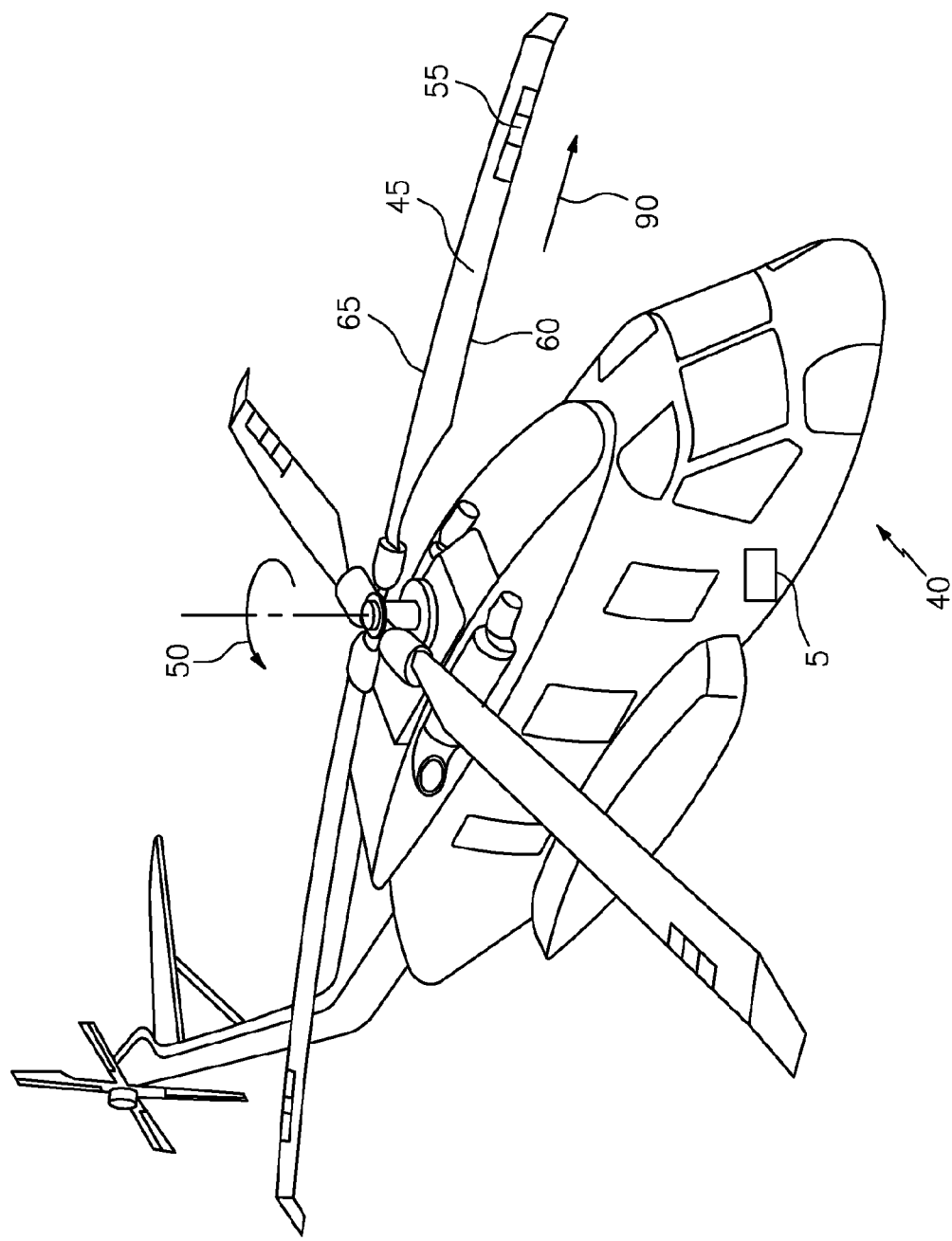
FIG. 1 illustrates a perspective view of a helicopter having rotor blade control surfaces controlled by a self-lubricated actuator with a lubricant level sensing system according to an embodiment of the invention.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Referring to FIG. 1, a helicopter 40 is depicted having one or more rotor blades 45 configured for rotation in a rotor direction 50. Each rotor blade 45 has one or more control surfaces 55 (three shown) disposed thereon. The helicopter 40 represents one example of a system that can incorporate one or more instances of a lubricant level sensing system for an actuator as further described herein. By way of example, while shown in the context of a conventional helicopter 40, it is understood that aspects could be used in other actuators other than the actuators for a blade, in coaxial helicopters, fixed wing aircraft, wind turbines, land and marine vehicles, industrial machinery or other environments in which lubricated actuators are used.

In the illustrated embodiment, control surfaces 55 are disposed on a trailing edge 60 of the rotor blade 45. As used herein, the trailing edge 60 is the edge of the rotor blade 45 that follows or trails the movement of the rotor blade 45 as rotation occurs in the rotor direction 50. Of course, it is contemplated by the present disclosure for control surfaces 55 to be disposed on a leading edge 65 of the rotor blade 45. Additionally, it is contemplated by the present disclosure for control surfaces 55 to be disposed on any combination of the trailing and leading edges 60, 65, respectively.

In accordance with the principles of the present disclosure, the pitch of each control surface 55 is controlled by a self-lubricated actuator 70 (FIGS. 2 and 3) onboard each rotor blade 45. In this manner and when used on the trailing edge 60, control surfaces 55 can be used to replace a swashplate. The self-lubricated actuator 70 (FIGS. 2 and 3) is a motor-based electromechanical actuator that contains an internal volume of lubricant without an external supply of lubricant onboard the helicopter 40. A flight control computer 5 may be used to detect an internal lubricant level and drive the self-lubricated actuator 70 (FIGS. 2 and 3) responsive to control inputs from a pilot or other system as part of a flight control system of the helicopter 40. Such detection can be through wired and/or wireless communication between the actuator 70 and the flight control computer 5.

Figure 2:
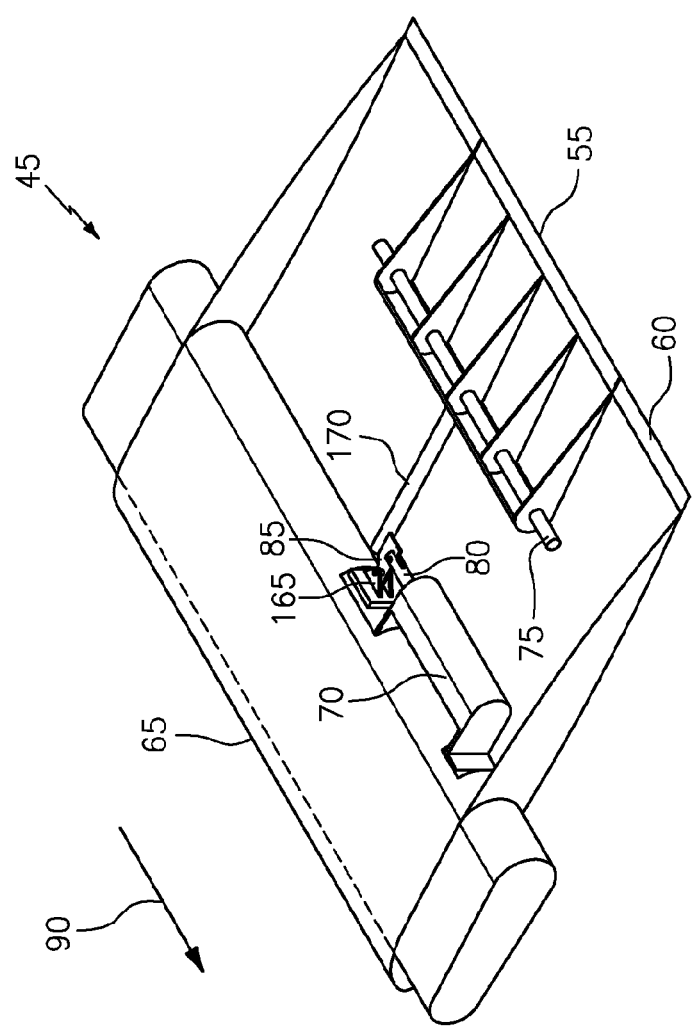
FIG. 2 illustrates a perspective view of a self-lubricated actuator onboard a rotor blade in a radial direction according to an embodiment of the invention.
Figure 3:
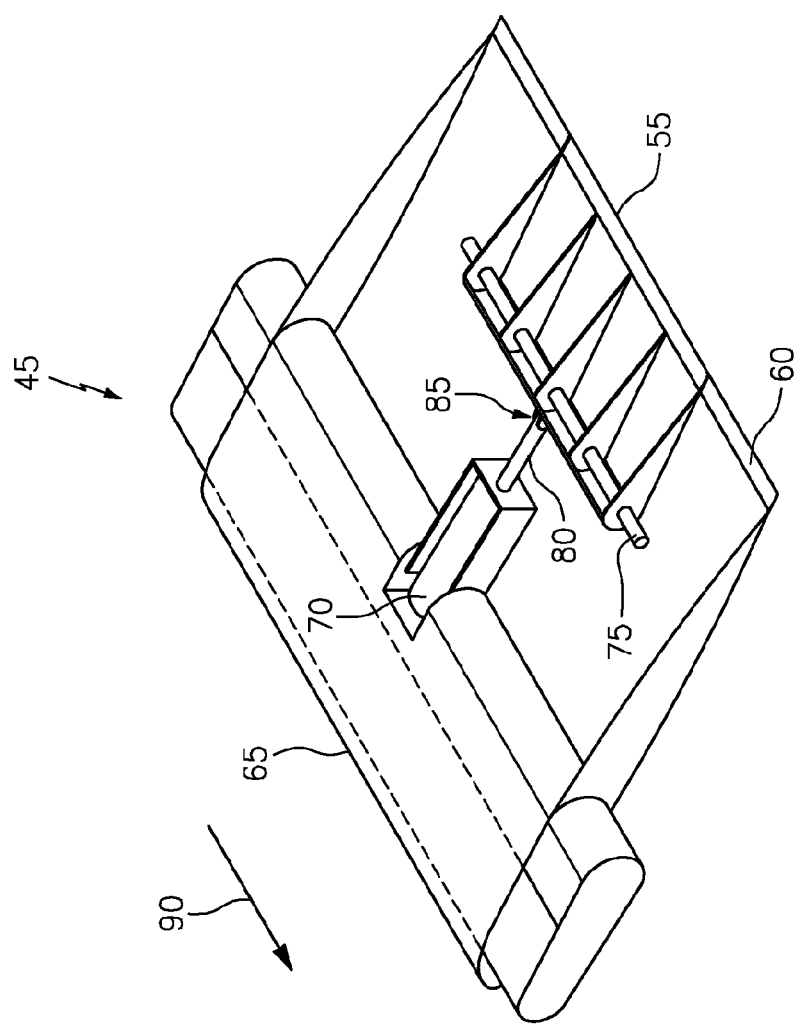
FIG. 3 illustrates a perspective view of a self-lubricated actuator onboard a rotor blade in a chordwise direction according to an embodiment of the invention.

As shown in FIGS. 2 and 3, an embodiment of the self-lubricated actuator 70 according to the present disclosure is shown. The self-lubricated actuator 70 can be placed onboard rotor blade 45 and is configured to rotate control surface 55, illustrated for purposes of example only on trailing edge 60, about a shaft 75. The self-lubricated actuator 70 includes an output rod 80 connected to control surface 55 via a first transmission part 85. The self-lubricated actuator 70 is configured to extend and retract output rod 80 from the actuator in a linear direction that is parallel of to a radial direction 90 of rotor blade 45. The radial direction 90 is defined as the direction that is generally parallel to the length of the rotor blade 45.

First transmission part 85 is configured to convert the linear extension and retraction movement of output rod 80 into a positive or negative rotational movement of control surface 55 around shaft 75 so that the control surface 55 can selectively change the pitch of rotor blade 45. In the illustrated embodiment, first transmission part 85 includes a crank 165 and a link 170.

In an alternate configuration depicted in FIG. 3, the self-lubricated actuator 70 is mounted onboard rotor blade 45 in a chordwise direction, namely perpendicular to radial direction 90. The chordwise direction is defined as the direction generally between the leading edge 65 and the trailing edge 60 of the rotor blade 45. In this embodiment, actuator 70 is configured to extend and retract output rod 80 from the actuator in the chordwise direction. Again, first transmission part 85 is configured to convert the linear extension and retraction movement of output rod 80 into a positive or negative rotational movement of control surface 55 around shaft 75 so that the control surface 55 can selectively change the pitch of rotor blade 45. Further, as depicted in greater detail in FIG. 4, the self-lubricated actuator 70 has a sufficient volume of lubricant 140 in the one or more internal cavities 100 so that, even when exposed to the centrifugal force, the lubricant 140 still substantially immerses the internal components of the self-lubricated actuator 70 (e.g., bearing 120, motor 110, second transmission device 125, etc.). The lubricant 140 can be any liquid lubricant known in the art, such as conventional oil, synthetic oil, or other known lubricating liquid. By maintaining the internal components of the self-lubricated actuator 70 substantially immersed in lubricant 140, even during high centrifugal forces, the self-lubricated actuator 70 is configured to ensure a substantially low friction operational environment.

Figure 4:
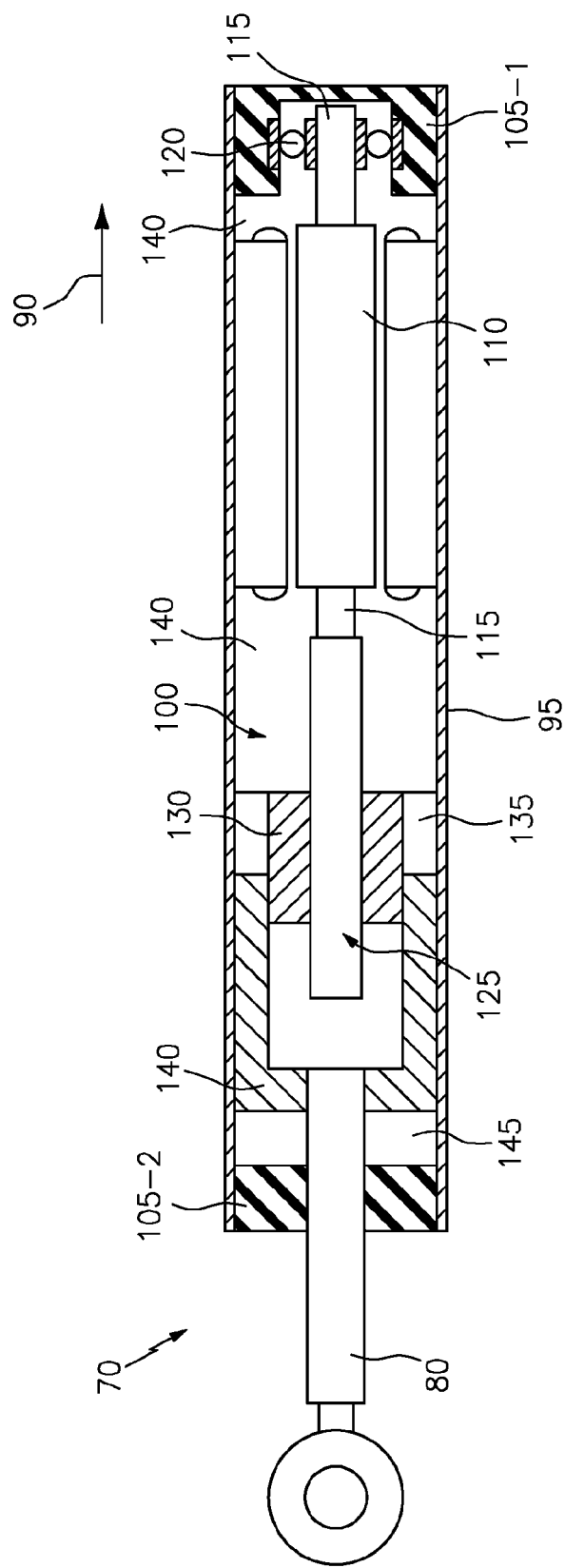
FIG. 4 illustrates a cross section of a self-lubricated actuator according to an embodiment of the invention.

With continued reference to FIG. 4, the self-lubricated actuator 70 has an outer housing 95 that encloses an internal cavity or lubricant reservoir 100. Outer housing 95 includes a first seal 105-1 at a first end and a second seal 105-2 at a second end to maintain the lubricant reservoir 100 substantially sealed. First seal 105-1 is a fixed seal, while second seal 105-2 is a sliding seal that allows output rod 80 to extend and retract.

In the example of FIG. 4, outer housing 95 encloses motor 110, which may be a brushless permanent magnet motor, having a motor shaft 115 that is free to rotate within bearing 120, which is positioned proximate to the first seal 105-1 at the first end. The outer housing 95 also encloses a second transmission device 125 operatively connected to output rod 80, where the second transmission device 125 is configured to convert a rotary movement of motor shaft 115 into the linear movement of the output rod 80 in the direction parallel to the radial direction 90. In the illustrated embodiment, the second transmission device 125 is a linear roller screw having a receiving component 130 and an outer screw block 135. It is contemplated by the present disclosure for the second transmission device 125 includes any component capable of converting the rotary movement of motor shaft 115 into the linear movement of the output rod 80 along radial direction 90.

The outer housing 95 encloses a volume of lubricant 140 that is sufficient to fill a substantial portion of internal cavity 100. A free volume 145 may exist in the internal cavity 100 to provide a displacement volume for the output rod 80. The free volume 145 contains a compressible gas, such as air. When the output rod 80 extends from the self-lubricated actuator 70, pneumatic pressure of the free volume 145 can be reduced. Similarly, when the output rod 80 retracts into the self-lubricated actuator 70, pneumatic pressure in the free volume 145 can increase. Depending on the orientation of the self-lubricated actuator 70, the free volume 145 can form in a predetermined location due to centrifugal force as the self-lubricated actuator 70 rotates with the rotor blade 45. Under normal operating conditions, a sufficient volume of lubricant 140 is retained within the internal cavity 100 such that the internal components of self-lubricated actuator 70 remain substantially immersed in the lubricant 140 even during high centrifugal force, which would tend to move the lubricant 140 within the internal cavity 100 in the direction of the centrifugal force. In the embodiment illustrated in FIG. 4, the centrifugal force is along the radial direction 90 and is directed towards bearing 120. Accordingly, the self-lubricated actuator 70, while substantially full of lubricant 140, is configured to maintain bearing 120, second transmission device 125, and motor 110 substantially immersed and, thus, lubricated by, lubricant 140. Moreover, since the centrifugal force is along the radial direction 90, the forces urge the lubricant 140 towards first seal 105-1 and away from second seal 105-2, which results in the free volume 145 forming proximate the second seal 105-2 and assists in preventing leakage of the lubricant 140 between the second seal 105-2 and output rod 80.

During normal operation, all critical moving parts within the outer housing 95 can be lubricated even during the high centrifugal force imparted on the self-lubricated actuator 70. In other words, there is expected to be a sufficient volume of lubricant 140 in internal cavity 100 so that, even when exposed to the centrifugal force, the lubricant 140 still substantially immerses the internal components of self-lubricated actuator 70 (e.g., bearing 120, motor 110, second transmission device 125). By maintaining the internal components of the self-lubricated actuator 70 substantially immersed in lubricant 140, even during high centrifugal forces, the self-lubricated actuator 70 is configured to ensure a substantially low friction operational environment.

In use, the lubricant 140 in the self-lubricated actuator 70 moves from a first position when the rotor blade 45 is in a non-operational state to a second position when the rotor blade is in an operational state (i.e., application of centrifugal force). While a minimum volume of lubricant 140 is maintained within the outer housing 95, the internal components of the self-lubricated actuator 70 remain substantially immersed in lubricant 140, even when the lubricant 140 is in the second position.

In addition to lubricating the internal moving components of the self-lubricated actuator 70, the lubricant 140 also operates as a medium of heat transfer. Under normal operating conditions, lubricant 140 substantially immerses contact surfaces of the bearing 120 and second transmission device 125 that experience friction during operation of motor 110. The lubricant 140 can transport heat away from motor 110 and the contact surfaces towards outer housing 95. Such heat transfer permits a substantial amount of power to be extracted from the motor 110 for rapid control surface movement. The viscous nature of the lubricant 140 can permit heat transport away from high friction sites towards the cooler parts of the outer housing 95, still substantially immersed in the lubricant 140. Further, the lubricant 140 transports the heat towards outer housing 95 to be dissipated outside of the self-lubricated actuator 70.

Should a loss of lubricant 140 occur from the self-lubricated actuator 70 below a minimum acceptable level, friction can increase in or between one or more internal components of the self-lubricated actuator 70. Increased friction can increase heat, reduce responsiveness, and may ultimately result in damage to the self-lubricated actuator 70 if not detected and remedied in a timely manner. Exemplary embodiments provide a lubricant level sensing system to detect a lubricant level in an actuator, such as the self-lubricated actuator 70. In the self-lubricated actuator 70, the lubricant 140 is not used as a hydraulic fluid to drive actuation; rather, the lubricant 140 is for lubricating and cooling internal components of the self-lubricated actuator 70.

Figure 5:
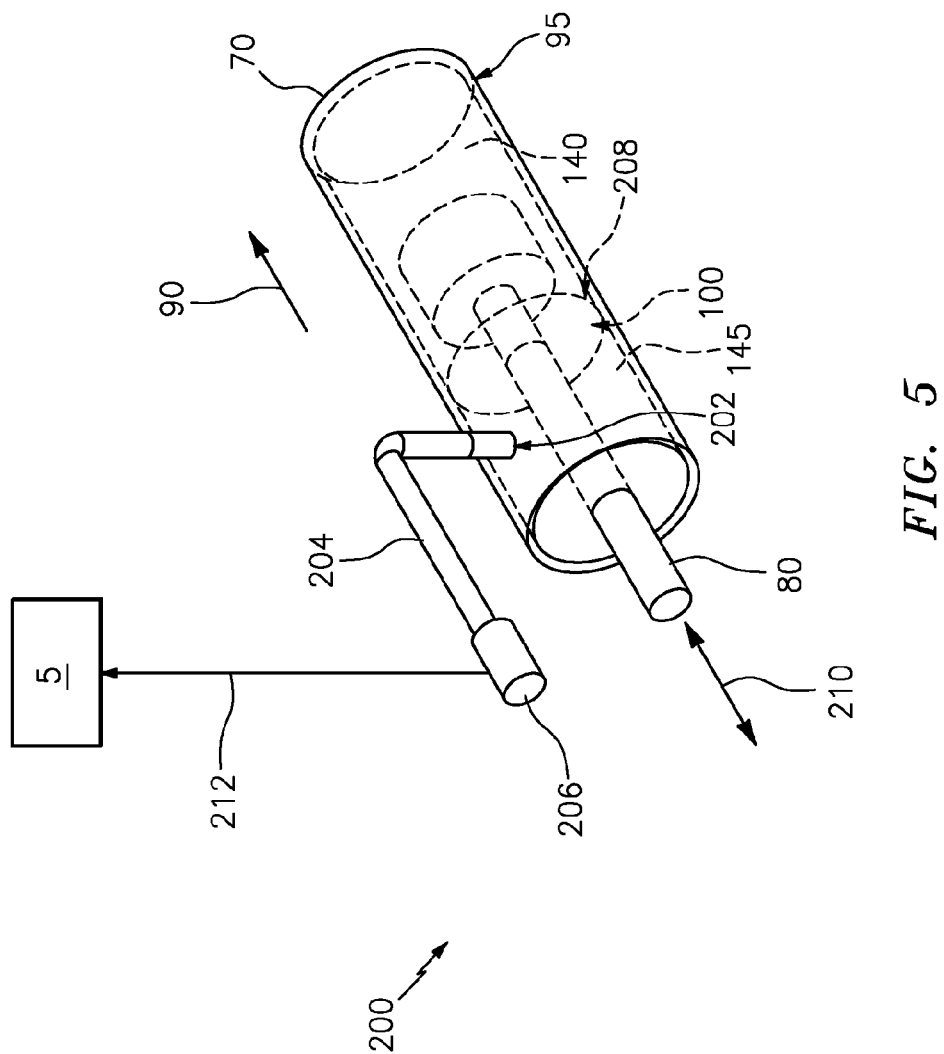
FIG. 5 illustrates a lubricant level sensing system including a pressure sensor according to an embodiment of the invention.

FIG. 5 depicts a lubrication level sensing system 200 according to an embodiment of the invention. As previously described, the self-lubricated actuator 70 is configured to retain a volume of lubricant 140 and may be implemented as an electromechanical actuator that drives the output rod 80. As can be seen in FIG. 5, the outer housing 95 of the self-lubricated actuator 70 includes a pressure port 202. The pressure port 202 can be positioned on the outer housing 95 to align with the free volume 145 while a centrifugal force is applied to the self-lubricated actuator 70, which in this example is in a radial direction 90 of rotor blade 45 of FIG. 1. A pathway 204 is coupled to the pressure port 202 and a pressure sensor 206 to establish fluid communication between the pressure sensor 206 and the free volume 145 of the internal cavity 100 of the outer housing 95 relative to a lubricant level 208 in the internal cavity 100. The pathway 204 may be large and include a pneumatic tube or be negligibly small wherein the pressure sensor 206 is essentially at or within the free volume 145. As such, the pressure sensor 206 detects a pressure of the free volume 145 to derive the lubricant level 208. The pressure sensor 206 may be a pneumatic pressure sensor that detects a pneumatic pressure of gas, such as air, contained in the free volume 145 as the output shaft 80 moves linearly as an oscillation 210; however, the invention is not limited to a particular type of pressure sensor 206 or oscillation 210.

An output 212 of the pressure sensor 206 can be monitored by the flight control computer 5 (FIGS. 1 and 7) relative to a frequency of the oscillation 210 of the output shaft 80 of the self-lubricated actuator 70. A change in the oscillation 210 may be detectable at the pressure sensor 206 as a pressure oscillation indicative of a change in the lubricant level 208. For example, at a particular frequency of oscillation 210 of the output shaft 80, a corresponding pressure oscillation can be detected as the pressure in the free volume 145 is increase and decreases. The free volume 145 is bound by the volume of lubricant 140 and the volume of the internal cavity 100. A sustained reduction in pressure oscillation amplitude detected by taking multiple readings from the pressure sensor 206 over a period of time may indicate a drop in the lubricant level 208, as the reduction in lubricant 140 increases the free volume 145.

Figure 6:
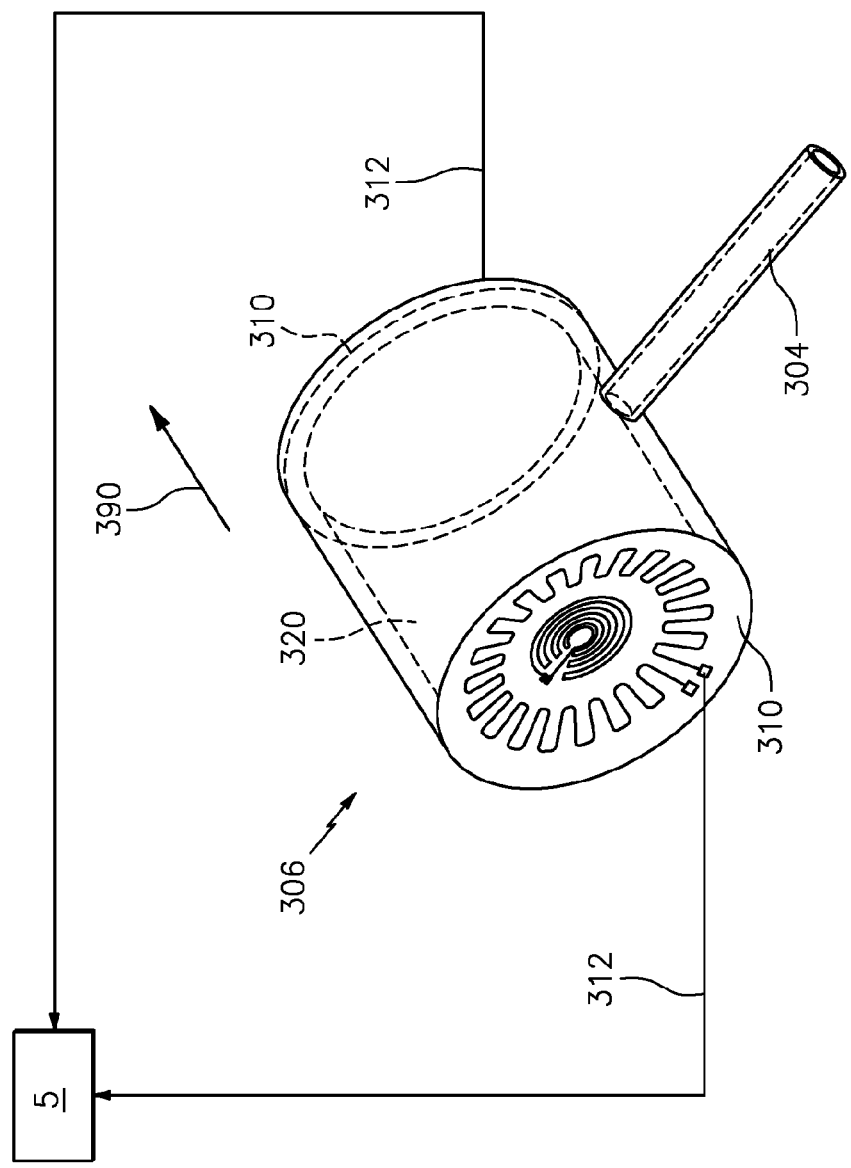
FIG. 6 illustrates an alternate embodiment of the pressure sensor of FIG. 5 according to an embodiment of the invention.

FIG. 6 illustrates an alternate embodiment of the pressure sensor 206 of FIG. 5 as a double-membrane pressure sensor 306 according to an embodiment of the invention. A pathway 304 can be coupled to the pathway 204 of FIG. 5. The pressure sensor 306 of FIG. 6 can provide immunity from bias created by centrifugal force 390, which may align with the radial direction 90 of FIG. 5. Immunity from forces in other directions can also be achieved. The pressure sensor 306 includes a pair of sensing membranes 310 that experience the same flexing due to loading responsive to the centrifugal force 390 and vibration. A pair of outputs 312 of the pair of sensing membranes 310 can be monitored by the flight control computer 5 to determine a difference signal as an unbiased measure of pressure in a pressure sensor cavity 320 of the pressure sensor 306. The pressure in the pressure sensor cavity 320 is directly related to the pressure in the free volume 145 of FIG. 5.

Figure 7:
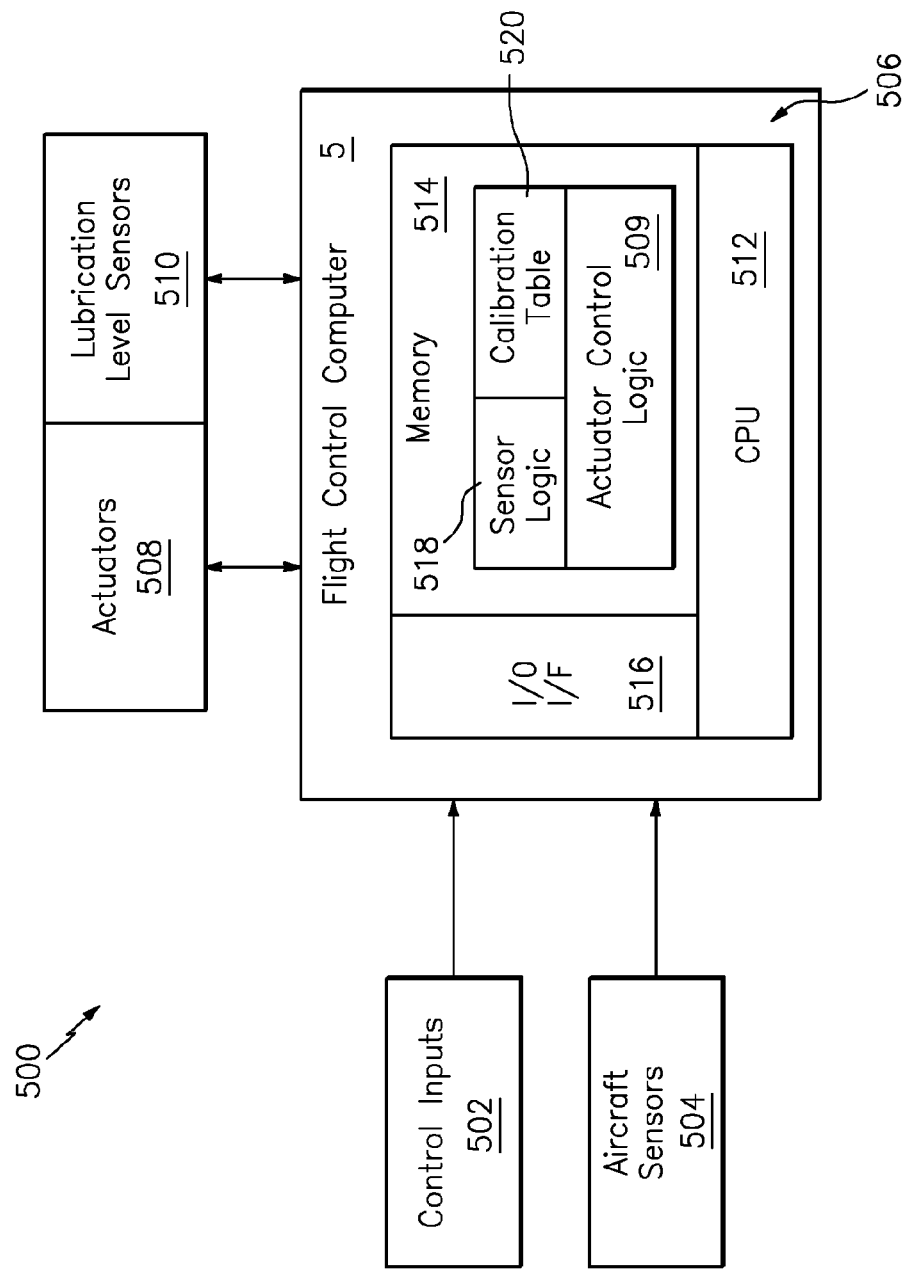
FIG. 7 illustrates a flight control system according to an embodiment of the invention.

FIG. 7 illustrates a flight control system 500 according to an embodiment of the invention. The flight control system 500 includes the flight control computer 5 of FIG. 1. The flight control system 500 may receive control inputs 502 and input from various aircraft sensors 504. The control inputs 502 can be pilot-initiated or initiated by another system, such as an autopilot (not depicted). The control inputs 502 can be used by a processing system 506 of the flight control computer 5 to control a plurality of actuators 508, where the actuators 508 may be embodiments of the self-lubricated actuator 70 of FIGS. 2-6. The flight control computer 5 can control the actuators 508 according to actuator control logic 509 to achieve particular positions at a desired frequency to drive one or more of the control surfaces 55 of one or more rotor blades 45 of the helicopter 40 of FIG. 1. Each of the actuators 508 may have one or more lubrication level sensors 510 as one or more instances of the lubrication level sensing system 200 of FIG. 5, which can utilize the pressure sensor 206 of FIG. 5, the pressure sensor 306 of FIG. 6, or another pressure sensor configuration known in the art.

The processing system 506 includes processing circuitry 512, memory 514 and an input/output (I/O) interface 516. The processing circuitry 512 can be any type or combination of computer processors, such as a microprocessor, microcontroller, digital signal processor, application specific integrated circuit, programmable logic device, and/or field programmable gate array, and is generally referred to as central processing unit (CPU) 512. The memory 514 can include volatile and non-volatile memory, such as random access memory (RAM), read only memory (ROM), or other electronic, optical, magnetic, or any other computer readable storage medium onto which data and control logic as described herein are stored. Therefore, the memory 514 is a tangible storage medium where instructions executable by the processing circuitry 512 are embodied in a non-transitory form. The I/O interface 516 can include a variety of input interfaces, output interfaces, communication interfaces and support circuitry to acquire data from the control inputs 502, aircraft sensors 504, actuators 508, lubrication level sensors 510 and other sources (not depicted), to drive the actuators 508, and to communicate with other subsystems (not depicted).

The memory 514 may include the actuator control logic 509 and sensor logic 518 as a sequence of instructions executable by the processing circuitry 512. In an embodiment, the sensor logic 518 performs a method when executed by the processing circuitry 512, which can include monitoring the output 212 of pressure sensor 206 of FIG. 5 or the outputs 312 of FIG. 6. The I/O interface 516 may receive the output 212 of FIG. 5 as analog or digital signal, and perform any preprocessing or signal conditioning needed such that a pressure value is determined. The sensor logic 518 can enable the flight control computer 5 to determine lubricant level in each of the actuators 508 based on the pressure of the free volume as detected using a pressure sensor, such as the pressure sensor 206 of FIG. 5 or the pressure sensor 306 of FIG. 6. The sensor logic 518 can perform frequency analysis to determine pressure signal characteristics, such as amplitude and frequency. In one embodiment, a discrete Fourier transform is applied at a frequency corresponding to a detected or driven frequency of the output shaft 80, which may be provided by the actuator control logic 509. The aircraft sensors 504 may provide a number of correction parameter values to account for variability in rotor speed, altitude, external temperature, pressure, air speed, vibration, aircraft orientation, and the like. More precise levels may be achieved when a calibration table 520 is applied to the computations. As one example, equation 1 or a variant thereof can be used to relate detected pressure from the pressure sensor 206 of FIG. 5 or from the pressure sensor 306 of FIG. 6 to a volume, and a difference in the volume relative to a known volume of the internal cavity 100 of FIG. 4 can be used to approximate a lubricant level.

$$V = (nRT)/P \quad \text{(Equation 1)}$$

V is volume of gas in the free volume 145 of FIG. 4. n is an amount of gas (moles). R is the ideal gas constant. T is absolute temperature of the gas. P is the absolute pressure of the gas based on readings from the pressure sensor 206 of FIG. 5 or the pressure sensor 306 of FIG. 6.

In one embodiment, the sensor logic 518 detects a change in pressure oscillation at the pressure sensor 206 of FIG. 5 or the pressure sensor 306 of FIG. 6 by monitoring pressure values collected over a period of time to determine oscillation characteristics of the pressure signal. A change in the lubricant level may be determined based on the change in pressure oscillation. For example, the calibration table 520 may include a mapping of pressure oscillation amplitude changes to lubricant level changes at particular oscillation frequencies.

While shown in the context of a flight control computer 5, it is understood that, in other aspects, the sensor logic 518, the calibration table 520, and the actuator control logic 509 can be included in a processor separate from the flight control computer 5, whereby the detected level can be communicated to the flight control computer 5 through wired and/or wireless transmission protocols. Such a processor could be included, by way of example, with the pressure sensor 206, 306 such that the pressure sensor 206, 306 also detects the lubrication level of the actuator 70.

Figure 8:
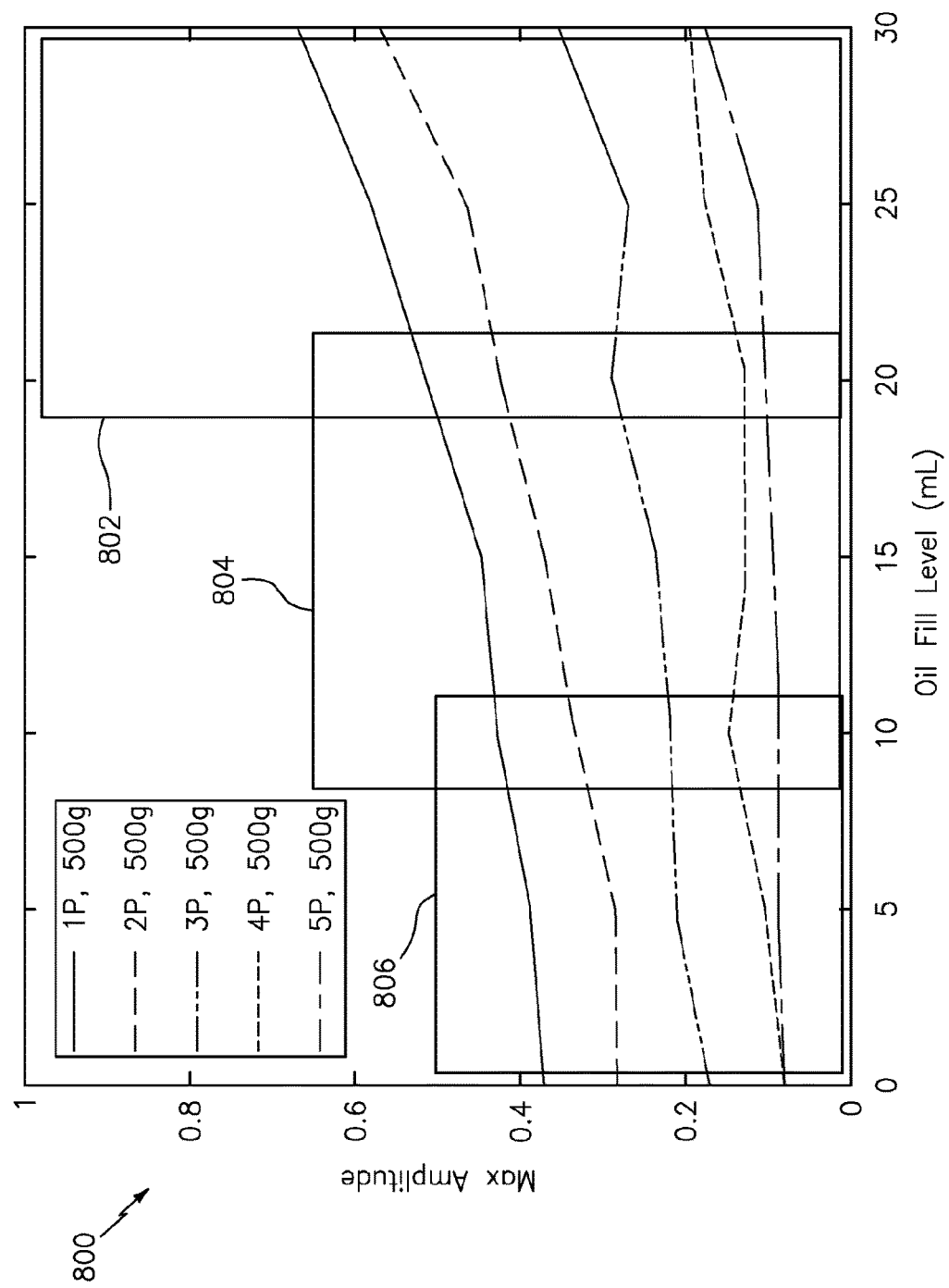
FIG. 8 illustrates an example of test data associated with an embodiment of the invention.

FIG. 8 illustrates an example of test data in a plot 800 associated with an embodiment, where the lubricant is oil. The plot 800 shows data from a series of spin-tests conducted on one embodiment of the actuator 70. The amount of oil (x-axis) in the actuator 70 was varied, and the peak-to-peak amplitude (y-axis) from the pressure sensor 206 was measured. Tests were conducted at 500 g of centripetal acceleration (or centrifugal load). Tests were conducted at five different actuation frequencies 1P, 2P, 3P, 4P, and 5P. Frequency 1P corresponds to once-per-revolution of a main rotor, e.g., for helicopter 40 of FIG. 1, which corresponds to a frequency of about 4.3 Hz in this example. Frequency 5P corresponds to five-times-per-revolution or about 21.5 Hz in this example. The trend of all lines for frequencies 1P-5P on plot 800 indicates that the peak-to-peak pressure levels vary as expected, that when there is more oil in the actuator 70 (i.e., less air), the amplitude is high, when there is less oil in the actuator 70 (i.e., more air), the amplitude is low. Regions 802, 804, and 806 on plot 800 define approximate levels of oil in the actuator 70 with associated actions. For instance, region 802 may define a sufficient oil region, region 804 may define an add-oil-soon region, and region 806 may define a critically-low oil region.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A lubricant level sensing system for an actuator, the lubricant level sensing system comprising:
   a pressure port in an outer housing of the actuator;
   an external pressure sensor; and
   a pathway from the pressure sensor to establish fluid communication between the pressure sensor and a free volume of an internal cavity of the outer housing relative to a lubricant level in the internal cavity such that the pressure sensor detects changes in pressure of the free volume used to derive the lubricant level.

2. The lubricant level sensing system of claim 1, further comprising a self-lubricated actuator configured to retain a volume of the lubricant and the free volume.

3. The lubricant level sensing system of claim 1, wherein the actuator is an electromechanical actuator that drives an output rod.

4. The lubricant level sensing system of claim 1, wherein the pressure port interfaces with the free volume while a centrifugal force is applied to the actuator.

5. The lubricant level sensing system of claim 1, wherein a change in pressure amplitude detectable at the pressure sensor is indicative of a change in the lubricant level.

6. The lubricant level sensing system of claim 1, further comprising a control computer operable to monitor an output of the pressure sensor relative to the position of the actuator, and to derive the lubricant level from the detected output of the pressure sensor.

7. The lubricant level sensing system of claim 1, wherein the actuator drives a control surface of a rotor blade of a helicopter.

8. The lubricant level sensing system of claim 1, wherein the pressure sensor comprises a pair of sensing membranes that produce a difference signal between a pair of outputs from the pair of sensing membranes.

* * * * *